Oct. 19, 1965   E. O. AICHELE   3,212,131
PLASTIC METERING MEANS

Filed Jan. 14, 1964   6 Sheets-Sheet 1

INVENTOR.
Ernest O. Aichele,
BY
Harry C. Mapro
Attorney

Oct. 19, 1965   E. O. AICHELE   3,212,131
PLASTIC METERING MEANS
Filed Jan. 14, 1964   6 Sheets-Sheet 6

INVENTOR.
Ernest O. Aichele
BY
Harry S. Shapiro
Attorney

United States Patent Office 3,212,131
Patented Oct. 19, 1965

3,212,131
PLASTIC METERING MEANS
Ernest O. Aichele, 300 Hollywood Ave., Hillside, N.J.;
Marie K. Aichele, administratrix of said Ernest O.
Aichele, deceased
Filed Jan. 14, 1964, Ser. No. 337,639
13 Claims. (Cl. 18—5)

The invention relates to means for metering predetermined amounts of moldable, hardenable plastic material.

There are a number of instances or applications where it is desired to deliver or deposit moldable plastic material of critically accurate amounts in rapidly timed sequence. For example, as disclosed in my application Serial Number 118,994, filed June 22, 1961, now Patent No. 3,135,019 of which the present application is a continuation-in-part, bottle caps or the like are provided with sealing liners by directly depositing charges of thermoplastic material in bottle caps in timed sequence, following which the charge in each cap is molded to provide a sealing liner for the cap. The individual charges of plastic material are quite small, being on the order of only a fraction of a gram. The charge must be of sufficient amount to suitably line the bottle cap upon molding. On the other hand, it is essential that the quantity of the charge be not so great as to interfere with proper molding or to be forced onto the rim or skirt of the cap, or to cause material to be wasted. It will be readily recognized that with charges so small, the quantity of each charge is highly critical, for a small variation from the desired predetermined amount results in a substantial measure of error or inaccuracy. Moreover, the critically accurate amounts deposited in the individual caps must be accomplished in timed delivery at high speeds for the particular machine under consideration is operated to process approximately 300 caps a minute.

Accordingly, it is a primary object of the invention to provide means for metering charges of moldable plastic material in accurate amounts, and to accomplish the delivery or deposit at a high rate of speed.

Another object of the invention is to provide an improved means for conveying an initially hard granular or powdered plastic material through means to heat the same for reduction thereof to a soft plastic condition or fused state, and thereupon to deliver the soft plastic material to a metering means for automatically measuring predetermined amounts of the heated plastic material, said metering means including synchronized means for cutting away and delivering or depositing the predetermined measured charges.

While the invention is particularly suitable for use in connection with the lining of bottle caps or the like, and will be described with relation to a cap lining machine, it will be understood that the metering means of the invention is not limited to this particular application or use. The metering means of the invention may be used in conjunction with any form of apparatus which requires the supply of plastic material in accurately ascertained quantities at a high rate of delivery.

These, and other objects and advantages of the invention, will be apparent from the following detailed description, taken in conjunction with the drawings, which illustrate the metering means of the invention with reference to a machine for lining bottle caps, in which:

FIGS. 12–19 illustrate another form of metering means in accordance with the invention, FIG. 12 being a vertical sectional view showing the relationship of the measuring plunger and delivery plunger assembly when the former is in its down position and supplying material to the latter for ejection thereby;

Figures 7, 8, 9, 10:
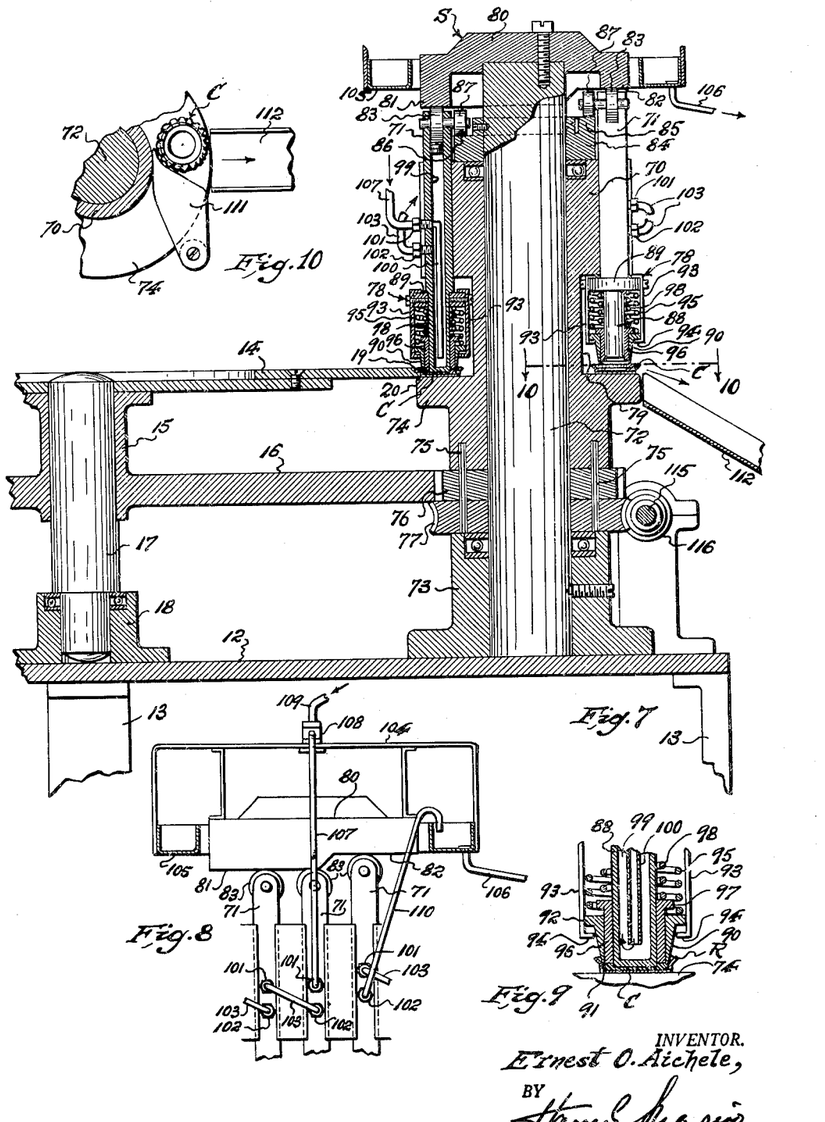
FIG. 7 is a vertical sectional view taken on line 7—7 in FIG. 1 and through the molding plunger turret, this view being drawn on an enlarged scale.
FIG. 8 is a fragmentary side elevational view of the molding plunger turret showing the coolant circulating means serving the molding plungers thereof.
FIG. 9 is an enlarged fragmentary vertical sectional view of the operative end of a molding plunger.
FIG. 10 is a fragmentary horizontal sectional view taken on line 10—10 in FIG. 7 showing the means for discharging seal lined caps from the machine.

Referring to the drawings and as shown in FIG. 7, the reference character 12 indicates the bedplate of the machine, the same being floor supported by legs 13, or any other suitable supporting framework; all of which is well within the competency of engineering skill to provide. Mounted upon the bedplate 12 is a rotatable turntable conveyor 14 which is affixed to the hub structure 15 of a driven gear wheel 16. This turntable conveyor and its gear wheel are rotatably supported by shaft 17 which is mounted in a thrust bearing 18 that is affixed to the bedplate 12. The shaft 17 may be either rotatably mounted in the thrust bearing 18 or may be affixed thereto so that, in the latter case, the turntable conveyor and its gear wheel will rotate thereon.

Figures 1, 11, 11A:
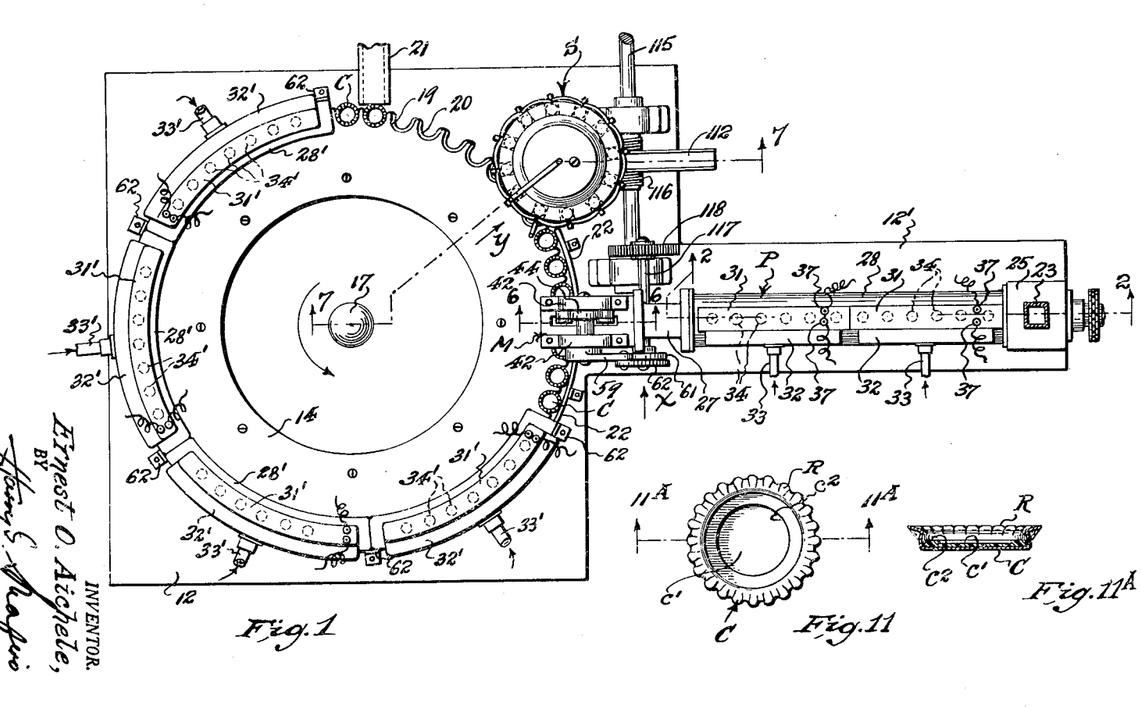
FIG. 1 is a plan view of a cap seal lining machine which includes the metering means and associated plastic conditioning means of the invention.
FIG. 11 is an inside plan view of a preferred form of seal lined cap produced by the illustrated cap seal lining machine.
FIG. 11A is a cross-sectional view taken on line 11A—11A in FIG. 11.

As shown in FIG. 1, the turntable conveyor 14 is provided in its margin portions with a series of circumferentially spaced, outwardly open, cap-receiving notches 19. These notches are provided with countersunk internal ledges or lips 20, upon which seat the flaring runs R of the cap bodies C, thus suspending the caps from the rotated turntable conveyor, whereby the caps are carried to metering means M by which a measured amount of thermoplastic seal liner forming material is deposited in the interior of each cap as it passes said metering means. Thereafter, the thus supplied caps are delivered by the turntable conveyor to a seal liner molding or shaping means S.

Suitable means (not shown) is provided for automatically supplying empty caps C to the receiving notches 19 of the turntable conveyor 14. Cap supplying means is well known in the art, and may be of any appropriate known design which includes a loading chute 21 by which the caps are delivered to and successively positioned in the receiving notches 19. A keeper ring or member 22 surrounds that portion of the turntable conveyor 14 which carries the caps C from the loading chute 21 of the cap supply means to the seal liner molding or shaping means S. The keeper ring prevents outward displacement of the caps from the supporting notches 19 to the point where the caps are engaged by and are withdrawn from the turntable conveyor by the seal liner molding means S.

The metering means M by which measured quantities or charges of plastic material are delivered to the caps C has associated therewith means P for conditioning the plastic material and for delivering the plastic material in a fused moldable condition to the metering means. The plastic material is supplied in an initial discrete, non-fused granular or pulverulant condition, preferably in the form of hard pellets which may flow by gravity from the supply hopper 23 to the conditioning means P. The plastic material is preferably a thermoplastic compound such as polyethylene or a vinyl resin such as a polyvinyl chloride or a copolymer of vinyl chloride and vinyl acetate. If desired, a thermosetting resin such as a suitable epoxy resin compound may be used.

Figures 2, 4:
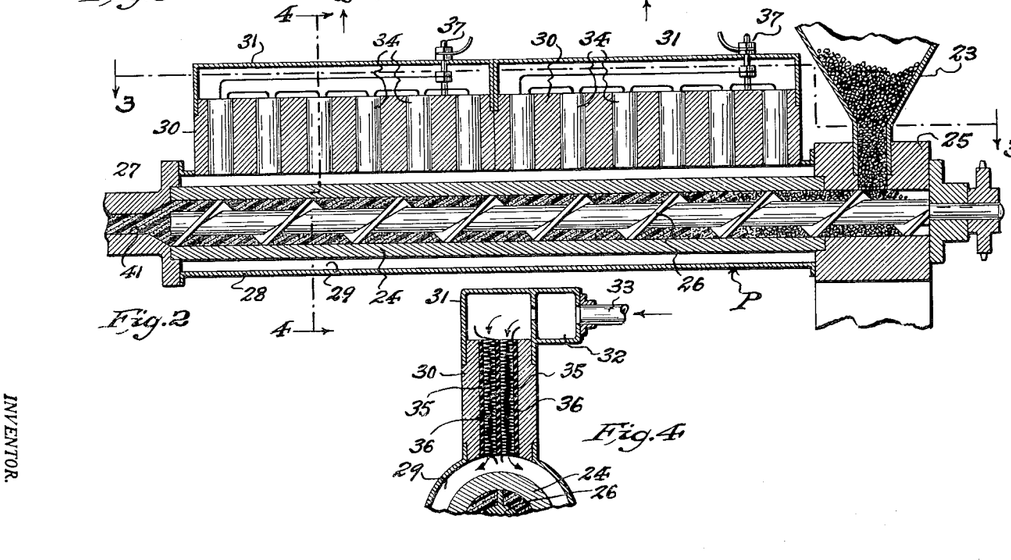
FIG. 2 is a longitudinal section taken on line 2—2 of FIG. 1, but drawn on an enlarged scale, this view showing the means for feeding plastic material to the metering device.
FIG. 4 is a fragmentary cross-sectional view taken on line 4—4 in FIG. 2, and further enlarged.
Figure 3:
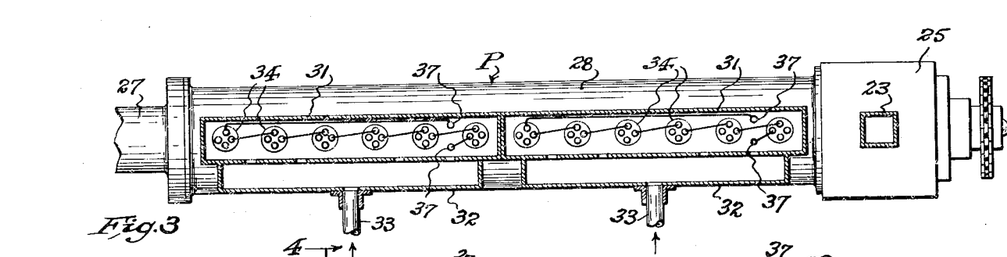
FIG. 3 is a horizontal sectional view taken on line 3—3 in FIG. 2.

As more particularly shown in FIGS. 2, 3, and 4, the means P for conditioning and feeding the plastic material to the metering means M comprises a tubular conduit 24 which extends forwardly from a header 25 to the metering means M. The header 25 may be supported by an extension 12' of the machine bedplate 12. Rotatably mounted in the header and conduit 24 is a helical extruder worm 26. Mounted in connection with the header 25 is the hopper 23 from which the initial powder or pieces of plastic material flow to the receiving end of the extruder worm 26. The discharge end of the conduit 24 and extruder worm 26 is connected in communication with the metering means M by a coupling fitting 27. Surrounding the conduit 24, between the header 25 and coupling fitting 27, in concentric spaced relation to the conduit 24, is a housing or jacket 28, the interior of which provides a jacketing air chamber 29 which surrounds or envelopes the conduit 24 and its extruder worm 26. Mounted in connection with the jacket 28 is air heater means 30 which provides a chambered air-receiving header means 31. Air-delivery manifold means 32 is in communication with the air-receiving header means 31. Air-delivery conduits 33 are connected with the manifold means 32, whereby air may be supplied by suitable means such as blower means (not shown) to the air heater means 30.

The air heater means 30 is provided with a plurality of electrical air heater devices 34 which extend between the air-receiving header means 31 and the jacketing air chamber 29. As shown in FIG. 4, each heater device 34 is provided with at least one, and preferably a plurality of air passages 35, each containing electrical heating coils 36. The heater coils 36 of the respective heater devices 34 are electrically interconnected in series, and the electric heater devices themselves are likewise connected in series to and between binding posts 37 to which electrical energy from a suitable source is supplied.

In the operation of the plastic material conditioning means P, the material in its initial discrete or particle form is delivered from the hopper 23 to the receiving end of the extruder worm 26, and is advanced by the latter toward the metering means M. As the plastic material is moved toward the metering means, it is subjected to heat and the kneading effect of the extruder worm, the heat being supplied by the heated air which, in passing through the heater devices 34 is delivered to the chamber 28 and around the conduit 24 and its contained extruder worm. The temperature to which the plastic material is raised depends upon the particular composition of the thermoplastic material being processed. For vinyl resins and polyethylene, a temperature range of approximately 350 to 370° F. is suitable. As thus subjected to heat and kneading, the initially discrete thermoplastic material is consolidated to a fused softened and plastic moldable condition where it is ready to be operated upon by the metering means M which deposits measured amounts of the fused heated plastic material within the caps C as the caps are advanced by the conveyor 14 to the metering means.

Referring now to the form of metering means M shown in FIGS. 1, 5, 6 and 6A, the same comprises an upstanding framework 38 supported by the bedplate 12, and includes a body section or block 39 which is disposed in overhanging relation to the notched marginal portion of the turntable conveyor 14. It will, of course, be understood that the metering means of the invention may be suitably supported in any desired manner and with relation to any conveying means for articles intended to receive measured charges of plastic material. The block 39 is provided with an intake passage 40 which is in communication wtih a passage 41 formed in the coupling fitting 27 leading from the plastic material conditioning means P. Mounted on the upper end of the framework 38 are spaced apart bearing members 42 to journal a rock shaft 43 on which is affixed a rocker member 44. The rocker member is provided with oppositely extending arms, the rearward rocker arm 45 and the forward rocker arm 46. The rocker member 44 is disposed between the bearing members 42 and above the block 38. A guide plate 47 is connected with the framework 38 in vertically spaced relationship with respect to the block 39. A vertically reciprocable measuring plunger 48 extends through the guide plate and into an opening which extends through block 39. In its downward movement, the measuring plunger intersects and crosses the exit end of the intake passage 40. The upper end of the measuring plunger 48 is connected by a link 49 to the rocker arm 45.

Figure 6:
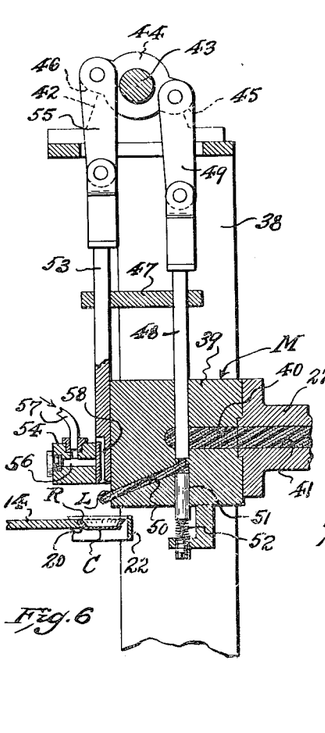
FIG. 6 is an enlarged vertical sectional view of the metering device taken on line 6—6 in FIG. 1, and showing the operation of the measuring means thereof.
Figure 6A:
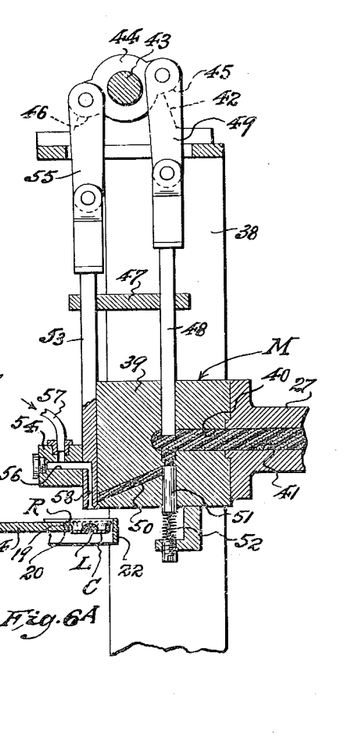
FIG. 6A is a view similar to FIG. 6, this view showing a measured quantity of plastic material being delivered to a passing cap to be seal lined therewith.

As shown in FIGS. 6 and 6A, a substantially horizontally extending discharge passage 50 is formed in the body section or block 39 and lies in a different plane or on a level just below the intake passage 40 in communication with the opening into which the measuring plunger 48 extends. The entrance end of the discharge passage and the exit end of the intake passage are on opposite sides of the opening into which the measuring plunger extends. The discharge passage 50 extends forwardly and is inclined downwardly, its exit end terminating at the inner face or the vertically extending surface of the block 39.

As shown in FIGS. 6 and 6A, a downwardly yieldable check valve 51 is slidably mounted in the block 39 in alignment with the measuring plunger 48 and below the intake passage 40. The check valve is normally urged upward by a compression spring 52 to intersect and close off the entrance to the discharge passage 50, such closing action taking place when the measuring plunger 48 is in its up position as shown in FIG. 6A. In this manner, the flow of the plastic material into the discharge passage 50 is assured and backflow of plastic material contained in the discharge passage is prevented.

As also shown in FIGS. 6 and 6A, a delivery plunger 53 is provided, the plunger being mounted for vertical reciprocation along the adjoining vertical face of the block 39. The delivery plunger extends through and is supported by the guide plate 47 and by a bridge block 54, the latter being affixed to the face of the block 39 above the outlet end of the discharge passage 50. Upon downward movement of the delivery plunger, the plunger intersects and crosses the outlet end of the discharge passage. The upper end of the delivery plunger is connected by a link 55 to the forward rocker arm 46. The notched marginal portions of the rotating turntable conveyor 14 pass beneath the block 39 to successively bring caps C beneath and into aligned opposition to the delivery plunger 53. An air passage 56 is formed to extend through the bridge block 54 to which passage compressed air from a suitable source is delivered by a supply conduit 57. The discharge end of the air passage is opposed to the outer side of the delivery plunger 53, and the latter is provided with an air vent passage 58, the outlet end of which opens downwardly through the lower extremity of the delivery plunger. As shown in FIG. 6A, the inlet end of the air vent passage 58 is brought into communication with the air passage 56 when the delivery plunger approaches and reaches the limit of its downward movement.

Figure 5:
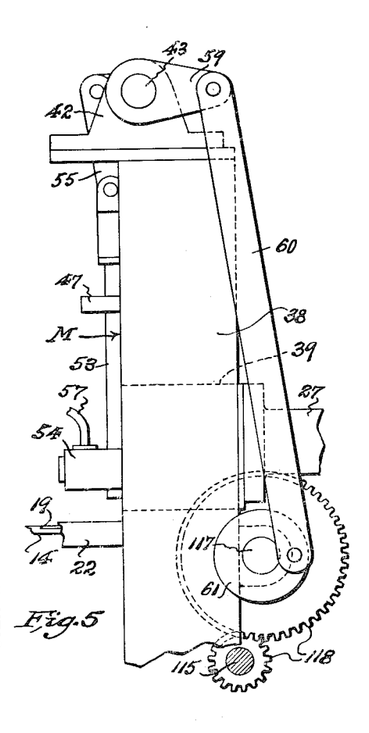
FIG. 5 is an enlarged side elevational view of a metering device in accordance with one form of the invention, this view being taken in the direction of the arrow X in FIG. 1.

As shown in FIG. 5, a lever arm 59 is affixed to the end of the rock shaft 43. The lever arm is connected by a link 60 with a crankwheel 61 which when rotated causes operative movement of the rock member 44 and alternate reciprocation of the measuring plunger 48 and the delivery plunger 53. In the form of the invention illustrated, the crankwheel 61 is rotated in synchronous relation to the rotary movement of the turntable conveyor 14, whereby the operations of the measuring and delivery plungers are timed so that individual measured charges of heated plastic material are delivered to successive caps.

In operation, the metering device or means M functions as follows: The driven extruder worm 26 feeds fused, heat softened moldable thermoplastic material to the intake passage 40 at a rate to keep the passage filled with material. As shown in FIG. 6, the measuring plunger 48, on its downstroke crosses the exit end of the intake passage, and thereby pushes down a predetermined amount of the plastic material into the discharge passage 50, the check valve 51 yielding and moving downwardly to such movement of the material. The check valve also aids in the transfer of the material to the discharge passage. This forcing of the material into the discharge passage causes a like measured amount of the material L to be forced from the outlet end of the discharge passage, and beneath the then raised delivery plunger 53. The charge L is in the form of a globule of heated plastic material. It will be understood, of course, that the diameter of the intake passage, the diameter of the opening in the block 39 into which the measuring plunger extends (and related diameter of the plunger), and the diameter of the discharge passage are selected to furnish a charge L of desired predetermined quantity.

When, as shown in FIG. 6A, the measuring plunger 48 is retracted or moved upwardly, the spring 52 causes the check valve 51 to close off the entrance end of the passage 50, thereby preventing any reaction or back movement of the material in the discharge passage or the disturbance or reduction of the mesured amount of the extruded material L. As the upward retraction of the measuring plunger 48 takes place, the alternate and downward operative stroke of the delivery plunger 53 occurs. The downward movement of the delivery plunger cuts away the extruded measured amount L of the heated plastic material located at the side or face of the block 39, and carries the same toward a cap C which the turntable conveyor 14 has moved into alignment with and beneath the delivery plunger. As the delivery plunger reaches the downward limit of its operative stroke, the air vent passage 58 is brought into communication with the air passage 56 in the bridge block 54, whereupon a jet of compressed air is discharged through the air vent passage and operates to separate the measured amount or charge L from the delivery plunger to drop it into the underlying cap (see FIG. 6A). These plastic material measuring and delivering operations are repeated in timed relation to coincide with the arrival of successive caps C as they are brought by the turntable conveyor 14 to the metering means M.

In order to prevent premature chilling or setting of the measured amounts L of heated plastic material delivered into the caps C, prior to subjecting the same to the operations of the molding and shaping means S, to which the charged caps are advanced from the metering means M, means is associated with the turntable conveyor 14 for preheating the caps C carried thereby to an elevated temperature, preferably approximating 320° F. This cap preheating means (see FIG. 1) extends from a point adjacent to the cap loading chute 21 to a point adjacent to the metering means M and is disposed in overlying relation to the notched marginal portions of the turntable conveyor and the caps carried thereby. Said cap preheating means is substantially the same as that above described in connection with the thermoplastic material conditioning means P, and comprises air chamber means 28' through which the conveyed caps C pass. Said chamber means 28' is supplied by air heated by electric heater coils 34' which are arranged in connection with air receiving header means 31' having air delivery manifold 32'. Air is delivered to the manifolds 32' by conduits 33', the latter being supplied by suitable means, such as blower means (not shown). The said cap preheating means is stationary, and is mounted on the bedplate 12 by supporting brackets or posts 62.

Referring now to the seal liner molding and shaping means S (see FIGS. 7, 8, 9 and 10 more particularly), the same comprises a rotatable turret 70 which is mounted on the machine bedplate 12 to border the notched marginal portion of the turntable conveyor 14. Thus turret 70 carries a plurality of reciprocatable molding plungers 71, which are circumferentially spaced around said turret at radial intervals to the radial interval spacing of the cap carrying notches 19 of the turntable conveyor 14. Rotatably supporting the turret 70 is a stationary upstanding pivoting shaft 72, which is supported from the bedplate 12 by a pedestal member 73 that is mounted on the latter. The turret 70 is provided with an annular laterally projecting anvil flange 74 which underlies caps C advanced to the molding and shaping means S by the turntable conveyor 14, whereby to back and support the caps C subject to the liner seal molding and shaping action of the molding plungers 71. Affixed to the lower end of the turret 70, as by coupling pins or keys 75, is a drive gear 76, which not only rotates said turret, but also meshes with and drives the driven gear 16 by which the turntable conveyor 14 is rotated in tuned relation to said turret. Also keyed to the drive gear 76 is a worm gear 77 which forms part of power transmission means hereinafter referred to, by which the turret and turntable conveyor are cooperatively actuated.

The molding plungers 71 are slidably supported by and around the turret 70 for vertical recprocation relative thereto. The molding plungers 71 are provided at their lower end portions with molding heads 78, the turret 70 having an annular recess 79, above its anvil flange 74, to accommodate said molding heads and the movements thereof when the molding plungers are reciprocated. The means for effecting timed downward operative strokes of the molding plungers 71 comprises a stationary circular depresser cam 80 which is affixed to the pivoting shaft 72. Thus depresser cam 80 is formed to provide a dependent high part cam skirt 81, which extends a substantial distance around the circumference thereof, whereby to cause, at the proper time, the downward operative strokes of the molding plungers, and to cause the downwardly moved molding plungers to dwell in molding contact with engaged thermoplastic material charged caps C for a sufficient length of time to assure setting of the molded seal liner. Said high part of cam skirt 81 terminates in a low part cam skirt 82. Mounted in connection with the upper end of each molding plunger 71 is a roller 83 that is adapted to be engaged by the cam skirts of the depresser cam 81. Also affixed to the pivoting shaft 72 is a retractor cam 84 having an upstanding high part cam skirt 85, which is opposed to the low part cam skirt 82 of the depresser cam 80 in spaced apart relation thereto, and a low part cam skirt 86, which is opposed to the high part cam skirt 81 of the depresser cam 80 in spaced apart relation thereto. Also mounted in connection with the upper end portion of each molding plunger 71 is an offset roller 87, which is adapted to be engaged by the cam skirts of the retractor cam 84 to effect timed upward recovery strokes of the molding plungers 71.

The molding head 78 of the molding plungers 71 each comprise an axially extending punch 88 of circular cross-section at the lower end portion of the plunger. Affixed to the upper end portion of the punch 88 is an annular collar 89. Concentric to the punch 88 is an axially movable fender sleeve 90, the outer surface of which is inwardly tapered to provide its bottom end with a knife-edge portion 91. This knife-edge portion 91 is adapted to enter a cap, to be seal lined within and around its side walls, and, when so entered, serves to prevent thermoplastic material undergoing a seal liner molding operation from contacting the side walls of the cap in obstruction of shoulders or crimp projections by which the cap is clamped to a bottle or jar mouth in use. The upper end of the fender sleeve 90 is provided with an external annular flange or shoulder 92, and, although axially movable, is supported against outward escape from its normal assembled position within the molding head 78 by dependent stirrups 93 that are secured to the collar 89, and which are provided with angular stop projections 94 disposed beneath the flange or shoulder 92. The fender alcove 90 is normally projected downwardly beyond the free bottom end of the punch 88 by a compression spring 95 located between its flanged upper end and the collar 89, being upwardly yieldable against the thrust of said spring when brought into contact with a cap C undergoing a seal lining operation. Axially slidable relative to and intermediate the punch 88 and the fender alcove 90, is a tubular seal cushion forming die 96, that is provided at its upper end with an external annular flange 97 to engage the fender sleeve 90, whereby to be held against outward displacement from its normal assembled relation to and within the molding head 78. Between the collar 89 and said die 96 is disposed a second compression spring 98 said die being upwardly yieldable against the thrust of the latter.

The molding plungers 71 and their punches 88 are provided with means to circulate a coolant, e.g. cold water, therethrough, whereby to facilitate chilling and setting of cap seal liners molded and shaped thereby when the plastic material is a thermoplastic resin. To this end, said plungers are provided with internal chambers 99. Within the chamber 99 each plunger extends, short of the bottom thereof, a coolant fluid intake tube 100 leading from an inlet nipple 101 which is entered through the wall of the plunger. The coolant fluid discharges from the chamber 99 through an outlet nipple 102, which is likewise mounted through the plunger wall.

As shown more particularly in FIG. 8, the outlet nipple 102 of one plunger 71 is connected by flexible tubing 103 to the inlet nipple of the next adjacent plunger, whereby the coolant fluid can circulate through all of the plungers from one to the other thereof. Supported by a framework 104, which, for example, can be mounted in connection with the stationary depresser cam 80, or otherwise mounted in any other suitable manner, is an annular catch basin 105 to receive the coolant fluid discharged from the plungers. A drain pipe 106 leads away from said catch-basin to carry off the discharged coolant fluid therefrom. Since the turret revolves the plungers, the coolant fluid is delivered by a feed tube or pipe 107 which is connected to the inlet nipple 101 of a first plunger. Said feed tube or pipe 107 is so shaped as to revolve about the catch-basin, and is connected by a swivel connection or union 108 to a supply pipe 109; the swivel connection or union being centrally mounted on the frame work 104. Extending from the outlet nipple 102 of the last plunger is a discharge tube or pipe 110 which communicates with the catch-basin 105.

In operation, the seal liner molding and shaping means S functions as follows:

A cap carrying notch 19 of the rotating turntable conveyor 14 comes into register with a plunger 71 of the turret 70 when the diameters of said turntable conveyor and turret reach alignment between the axes thereof. Under these conditions a cap C in said carrying notch 19 is disposed upon and supported by the anvil flange 74 of the turret 70, and the high part cam skirt 81 of the depresser cam 80 engages said plunger 71 and causes its downward operative stroke. Such downward stroke of said plunger 71, as best shown in FIG. 9, first carries the knife-edged fender sleeve 90, of the molding head 78, into said cap contiguous to the side walls thereof, said fender alcove yielding to the thrust of its compression spring 95 on contact with the cap. The fender sleeve is thus disposed to cover the side walls and clamping shoulders of crimps of the cap, so as to prevent contact of molded and shaped plastic material therewith. After this, the punch 88 engages the soft measured amount of plastic material L contained in said cap C, and thereby spreads this material over and upon the interior surface of the cap top wall, thus forming a seal liner body C' in adhered relation thereto and thereon (see FIGS. 11 and 11A). This spreading application of the plastic material by the punch 88 operates to crowd a portion of the material toward the fender sleeve shielded side walls of said cap C. As a result of this, the material so forced is brought into engagement with the upwardly yieldable seal cushion forming die 96, whereby the material enters beneath and thrusts upwardly the latter against the tension of its spring 98, with the effect of providing the seal liner formation with a thickened, offset and resilient annular cushion portion $C^2$ which, in the use of the cap, readily adjusts itself conformably to the contours of a bottle or jar mouth to which the cap is applied with assured tight sealing effect. After this, as the turret revolves in clockwise direction and the turntable conveyor in counter-clockwise direction, and while the plunger 71 remains downwardly moved to its seal liner forming position, said cap is carried on by the rotating turret and the engaging plunger, so as to be withdrawn from the carrying notch 19 of the turntable conveyor. In the meantime a following cap and plunger are brought into aligned opposition for repetition of the above described seal liner application to such following cap.

Since the plungers are cooled the reduced temperature thereof, being transmitted to the formed liner material, serves to harden and set the seal liner when of thermoplastic material. Such cooling and resultant setting effect continues while the plunger remains in contact with the cap as advanced by the turret, and is complete by the time the plunger is retracted and withdrawn from the cap by the operation of the retractor cam 84. When the finished seal liner provided cap is released by the retracted plunger, it is carried by the supporting anvil flange 74 of the turret 70 to a point of discharge, where it encounters a stationary deflector member 111, which is suitably supported from the bedplate 12 to overlie the anvil flange 74 (see FIG. 10). This deflection member 111 turns off the finished cap and directs the same into a discharge chute 112, by which it is conveyed out of the machine to a collecting depository (not shown).

Illustratively, the power transmission means for actuating the turret 70 and turntable conveyor 14 comprises a power shaft 115 provided with a drive worm 116 to engage the heretofore described worm wheel 77. The crank-wheel 61 of the metering means M is rotated by a counter-shaft 117 which is driven from the power shaft 115 by gearing 118. The extruder worm 26 of the plastic material conditioning means P can be independently driven at a desired predetermined slow speed, or may be driven from the power shaft 115 by suitable intermediate transmission means (not shown). It will be understood that the power transmission will be so designed and operative as to actuate the turntable conveyor 14, the turret 70 and the metering means M in the necessary coordinated and timed relation.

FIGS. 12-19 illustrate another and a preferred embodiment of metering device, generally designated M'. Parts of this embodiment of the invention which are like parts hereinbefore described with regard to the metering device M are given like reference characters.

The reciprocable measuring plunger 48 is positioned in an opening 120 which extends vertically through the block 122. The opening 120 is in communication with the exit end of intake passage 40 leading to the previously described plastic material conditioning means P. The measuring plunger is surrounded by a packing 124 situated in a recess formed in the block 122, the packing preferably being a heat resistant material such as asbestos. A washer 126 is located on the lower side of the packing and a flanged member having a boss 130 confines the packing on the other side. The flanged member is provided with an opening to allow the measuring plunger to extend therethrough with a close fit, and the flanged member is secured to the top of the block by screws 132.

Figure 12:
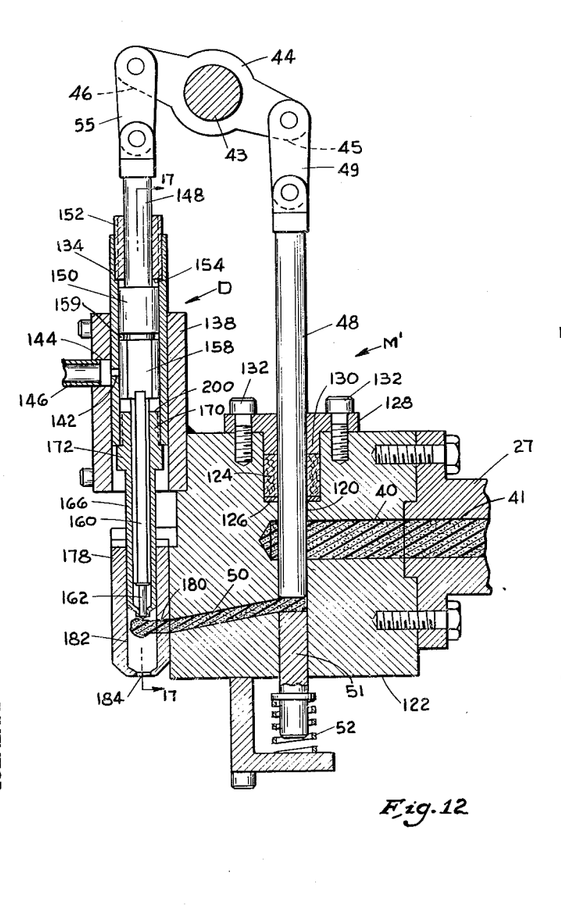
Figure 13:
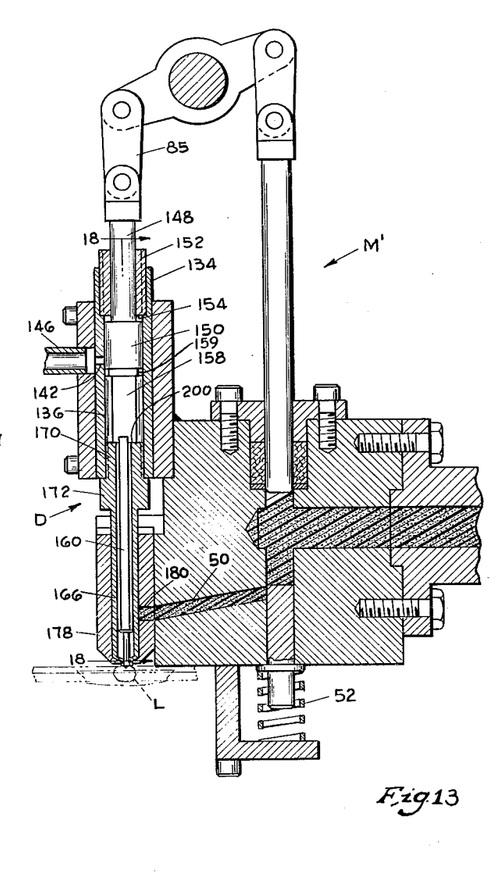
FIG. 13 is a view similar to FIG. 12, this view however, showing the relationship of the measuring plunger and the delivery plunger assembly when the latter is down and just prior to ejection or deposition of a measured charge.

As shown in FIGS. 12 and 13, the block 122 is provided with a discharge passage 50 related to the intake passage 40 and the intermediate opening 120 within which the measuring plunger rides in the same way as these elements are related to one another in the previously described metering means of FIGS. 6 and 6A. Also, a check valve 51 resiliently loaded by a compression spring 52 is positioned in the opening 120 and related to the measuring plunger and the discharge passage in the same manner as previously described. The measuring plunger is vertically reciprocated thruogh the medium of the rocker member 44 as previously described, the rocker being actuated by the power transmission previously described, or the rocker may be connected to any suitable actuating means which will impart rocking motion thereto.

The essential difference of the metering device M' as compared to the previously described metering means resides in the delivery plunger and its associated parts which are referred to as the delivery plunger assembly and is designated D. The delivery plunger assembly to be hereinafter described is particularly suited for dispensing or metering measured charges of polyethylene which is quite sticky at the desired temperature of processing; that is, approximately 370° F.

Figures 14, 15, 16, 17, 18, 19:
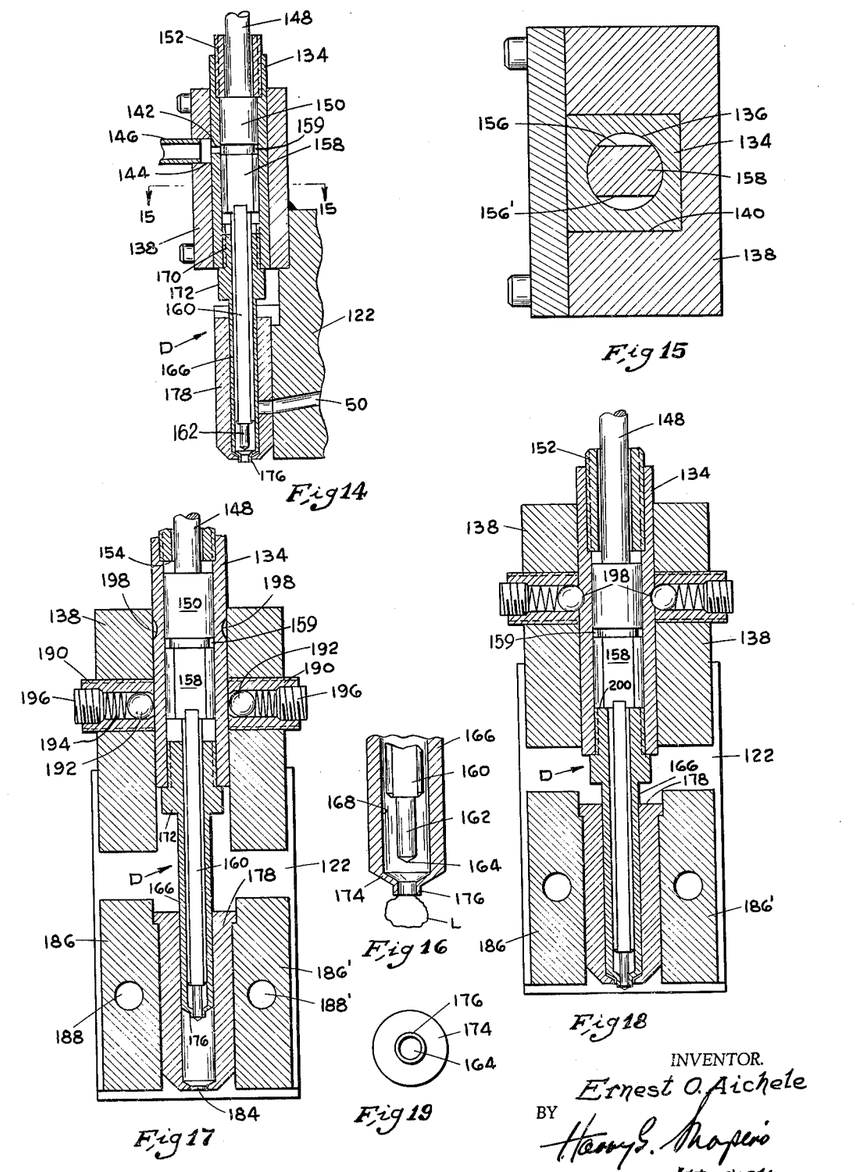
FIG. 14 is a vertical cross-sectional view showing the relationship of the elements of the delivery plunger assembly as the measured charge is ejected or separated from the metering device.
FIG. 15 is a horizontal cross-sectional view taken approximately in the plane of line 15—15 of FIG. 14.
FIG. 16 is a partial vertical cross-sectional view on an enlarged scale showing the configuration of the free end of the delivery plunger and the relationship therewith of the end of the valve stem with which the plunger is associated at the stage of the cycle shown in FIG. 14.
FIG. 17 is a side elevational view, partly in section, showing the delivery plunger assembly when viewed in the direction of line 17—17 in FIG. 12.
FIG. 18 is a view similar to FIG. 17 when viewed in the direction of line 18—18 in FIG. 13.
FIG. 19 is the plan view of the bottom end of the delivery plunger and associated needle valve stem shown in FIG. 16.

The delivery plunger assembly D comprises an outer slide member 134, which is in the form of a hollow sleeve preferably having a flat sided or square configuration on its outer periphery (FIG. 15). The slide member 134 has a circular bore 136 extending therethrough. The slide member is mounted for vertical reciprocation in a guide member 138, the interior of which has a vertical opening 140 extending therethrough having a mating configuration with the square outer periphery of the slide member. As shown in FIGS. 12, 13, 17, and 18, the guide member 138 is fixed to the side of the block 122 near the upper end thereof.

As shown in FIGS. 12, 13, and 14, the side wall of the outer slide member 134 has an orifice 142 extending therethrough, and the guide member 138 is provided with an opening 144 through a wall thereof, the latter opening having positioned therein a conduit 146 connected to a source of compressed air (not shown) which is delivered in a heated condition.

As also shown in FIGS. 12 and 13, an inner slide member 148 is positioned to extend through the bore 136 of the outer slide member 134 for relative movement with respect thereto as well as movement therewith, as will be subsequently described. The inner slide member is of a length to project beyond the upper and lower ends of the outer slide member. The upper end of the inner slide member is connected to the link 55 which in turn is connected to the rocker member 44. The inner slide member is formed to provide a portion 150 of enlarged diameter for a close sliding fit within the bore 136 of the outer slide member 134. The portion 150 is located within the outer slide member to coact with the orifice 142 and to act as an air valve as will hereinafter be described. The area between the outer slide member and the portion of the inner slide member above the enlarged diameter 150 is closed off by an externally threaded nut 152 which is threaded into a matingly threaded portion on the inner diameter at the upper end of the outer slide member 134. The nut 152 has a central bore to allow the inner slide member 148 to extend therethrough. The wall thickness of the nut is such as to provide a shoulder 154 which extends into the path of the portion 150 to thereby provide a stop to limit relative movement between the inner and outer slide members at this upper end of the assembly.

As shown in FIGS. 12, 13, and 15, the inner slide member 148 is provided with opposite flat sides 156 and 156' for a portion of its length 158. An annular recess 159 is provided between the sections 150 and 158 by reducing the diameter of the inner slide member at such intermediate area. The recess 159 is of a height substantially equal to the diameter of the nozzle 142. Thereafter, the remainder of the length of the inner slide member is formed on a reduced diameter to provide a section 160 which terminates in a section 162 of further reduced diameter. The terminal end 164 of the section 162 (FIG. 16) is conically contoured. The section 160 is provided with flats on opposite sides like the flats on the section 154. If desired, the section 160 may be made cylindrical throughout its length but of a reduced diameter to furnish sufficient clearance for the passage of air between its sides and a surrounding delivery plunger or ejector member 166. As will be subsequently described, the section 162 and its terminal end 164 function as a needle valve.

The lower end of the outer slide member 134 has secured thereto the delivery plunger or ejector member 166 which has a central bore 168 within which the inner slide, or the sections thereof of reduced diameter 160 and 162, are received for sliding movement. As shown in FIGS. 12, 13, 14, 17, and 18, the ejector member 166 is provided at its upper end with an externally threaded portion 170 located immediately above a flanged portion 172. The ejector member is matingly threaded into the lower end of the outer slide member 134, the extent of threading being limited when the flange 172 butts up against the end of the slide member. Thus, the ejector member 166 is an extension of the outer slide member 134. Due to the different inner diameter desired, the outer slide member and its extension are made as two separate parts and secured to one another.

As best shown in FIG. 16, the lower extremity of the ejector member 166 has the wall thereof thinned down and inwardly tapered at 174 and terminates in an annular wall 176 having a smaller inner diameter than the bore 168. The annular wall 176 has an internal diameter to receive the terminal end 164 of the inner slide's needle valve portion with a close, airtight fit.

As shown in FIGS. 12, 13, 17, and 18, the ejector member 166 is mounted for vertical movement in a lower guide member 178 which is fixed to the face of the block 122 near the lower end thereof. Though the upper and lower guide members 138 and 178 may be fabricated to provide guide means in the form of a single member, for ease of manufacture it is preferred to make them as separate members as illustrated to accommodate the different diameters of the outer slide member and its extension 166. The guide member 178 is provided with a horizontally extending opening 180 through the inner wall thereof in alignment with the discharge passage 50. The internal bore 182 of the guide member 178, within which the ejector member 166 is received for sliding movement, is provided at its lower end with an orifice 184 of reduced diameter. The internal diameter of this orifice is of a size to receive the annular end 176 of the ejector member 166 with a snug fit when the outer slide and its ejector member are in lowermost, ejecting position as shown in FIG. 14.

As shown in FIGS. 17 and 18, the lower guide member 178 is supported on the block 122 between a pair of laterally spaced support plates 186 and 186'. The support plates are provided with openings through which extend for positioning in aligned openings in the block 122, a pair of heater elements 188 and 188' to maintain a high temperature in the area surrounding the passage for the plastic material as it is being transferred within the metering device to the point of deposit for delivery.

As previously indicated, the inner slide member 148 is mounted for movement with the outer slide member 134 as well as for relative movement with respect thereto. As shown in FIGS. 17 and 18, the guide member 138 within which the outer slide member 134 is mounted for vertical reciprocation has a pair of oppositely arranged clutch devices for momentarily holding the outer slide member while permitting the inner slide member to move with respect to the outer slide member. The oppositely arranged clutch devices are located on substantially the same level as the conduit 146 which extends into the guide block 138, but are located approximately 90° from the position of the compressed air conduit. The clutch devices each comprise an annular clutch guide sleeve 190 positioned in a horizontally extending opening formed in the guide member. Within each clutch sleeve, a ball 192 is located at the inner end for engagement with the wall of the outer slide member 134. The ball is resiliently pressed against the outer slide member wall by a spring 194. The desired amount of spring loading may be adjusted by a set screw 196. The wall of the outer slide member 134 is provided with oppositely arranged grooves 198 for coaction with the spring loaded balls 194.

In order to minimize wear upon the area of the lower guide member 178 in the vicinity of the orifice 184 where the surrounding wall is engaged by the end of the ejector member 166, a limit stop 200 is provided remote from this area, such limit stop being provided by the upper end of the nut 172 when engaged by the lower end of section 158.

The operation of the delivery plunger assembly D will now be described. As shown in FIG. 12, when the measuring plunger 48 has moved down and forced plastic material out of the exit end of the discharge passage 50, the charge of plastic material is positioned within the bore 182 of the guide member 178 just in front of the ejector member 166. At this stage, and with the delivery plunger assembly in its raised position, the extremity 164 of the inner slide member is located in the orifice at the lower end of the ejector member 166, thereby providing a closed end for the ejector member. When the rocker member 44 moves the inner slide member 48 downwardly, the lower end of its section 158 engages the nut 172 which connects the outer slide 134 to its extension 166 whereby the outer slide member and the ejector member 166 move down the inner slide member. As a result, the charge of plastic material L is driven out of the orifice 184 at the lower end of the guide member 178. When this occurs, and the outer slide member 134 has moved from the position shown in FIG. 17 to the position shown in FIG. 18, the balls 192 of the clutch devices enter the grooves 198, and act to momentarily hold in the down position the outer slide member and the ejector member 166 which is affixed thereto. At this stage of the cycle, and as shown in FIG. 13, the section 150 of the inner slide member covers the orifice 142 to cut off the supply of heated compressed air.

When the inner slide member 148 is retracted toward the up position by the rocker member 44, the clutch means retains the ejector member 166 in the down position of FIGS. 13 and 18 with the guide member 178 for a short period before the outer slide member and its connected ejector member are also retracted to the up position. As shown in FIG. 14, when the inner slide member 148 moves up, the orifice 142 is uncovered and aligned with recess 159, whereby heated compressed air flows down along the sides of inner slide member's sections 158, 160, and 162 to the now open orifice in the lower end of the now open ejector member 166, and acts to eject the globule or measured charge L of plastic material from the open end of the guide member 178. The flats 156 and 156' on the section 158 and the flats on the sides of the section 160 furnish the communicating passages from the orifice 142 to the orifice 184 at the end of the guide member 178, the section 162 and its terminal 164 cooperating with the opening at the end of ejector member to furnish a needle valve action. Upon continued upward movement of the inner slide member 148, the shoulder 154 provided by nut 152 is engaged whereby the inner slide member carries with it the outer slide member 134 and the ejector 166 which is affixed thereto. The cycle is repeated with the alternate reciprocation of the measuring plunger 48 and the discharge plunger assembly D.

From the foregoing description, it will be apparent that the needle valve portion of the inner slide member cooperates with the ejector member to provide a closed punch for a delivery plunger end to cut off the charge presented from the exit end of the discharge passage 50. The cooperating needle valve portion and ejector member drive the charge out through the orifice 184 of the lower guide member 178. The pin-like, conical end 164, together with the illustrated configuration of the ejector member's end (174, 176), cooperate with the shown configuration of the guide member surrounding the orifice 184 to provide a thin, angled or feathered edge at the cut-off, thereby making it much easier for the heated air blast to separate the charge from the guide member. The area presented to the air blast to separate the charge from the wall surrounding the opening 184 is very thin and comparatively small. As a result, though the plastic material may be quite sticky, the disclosed arrangement permits the measured charges to be rapidly delivered and expeditiously cut off or separated from the metering or dispensing device.

It is believed that the advantages of the plastic metering means of the invention will be apparent from the foregoing detailed description of several preferred embodiments thereof. It will be apparent that various changes and modifications may be made to the illustrated preferred embodiments of the invention which have been described without departing from the spirit and scope of the invention as sought to be defined in the following claims.

I claim:
1. A metering device for dispensing measured amounts of moldable plastic material comprising a body section having a material intake passage and a discharge passage in communication with the intake passage, a reciprocable measuring plunger adapted to deliver a predetermined quantity of plastic material from the intake passage to the discharge passage, said plunger being movable between the exit end of the intake passage and the inlet end of the discharge passage, means responsive to the movement of the measuring plunger to close communication between the intake passage and the discharge passage when the measuring plunger is retracted, a delivery plunger assembly adjacent the exit end of the discharge passage, said delivery plunger assembly comprising an upper hollow guide member secured to said body section, a hollow outer slide member mounted for reciprocable movement in said guide member, a lower hollow guide member secured to said body section having the interior thereof in communication with the outlet end of said discharge passage, a hollow ejector member secured to an end of said outer slide member for movement therewith received in said second guide member, an inner slide member positioned to extend through said outer slide member and extending into said ejector member, said lower guide member being formed to provide a dispensing orifice and said ejector member having an annular wall defining an opening in the lower end thereof, said annular wall being receivable in said orifice with a close fit, said inner slide member being formed to provide communication between a source of compressed air and said ejector member opening, said inner slide member also being formed at the end thereof for cooperation with the opening in the ejector member to provide both a delivery plunger and a valve depending upon the position of the inner slide member with respect to the ejector member, means for imparting alternate reciprocation to the measuring plunger and to the inner slide member, means for causing the outer slide member and ejector member to move with the inner slide member, and means for retaining the ejector member adjacent said guide member orifice before its retraction with the inner slide member.

2. A metering device as set forth in claim 1; wherein the upper guide member is provided with an orifice in a wall thereof for communication with the source of compressed air, and the inner slide member has a section of a diameter to provide a valve for cooperation with said orifice, the remaining length of the inner slide member being of a diameter to provide a communicating passage between such remaining length and the surrounding outer slide member and surrounding ejector member.

3. A metering device as set forth in claim 1; wherein the means for retaining the ejector member adjacent said guide member orifice comprises clutch means positioned at the upper guide member and cooperable with the outer slide member.

4. A metering device as set forth in claim 1; wherein the area of the lower guide member adjacent its dispensing orifice and the area of the ejector member adjacent the annular wall thereof receivable in the dispensing orifice are of a configuration providing means to impart an angled edge to the plastic charge forced through the dispensing orifice.

5. A metering device as set forth in claim 1; wherein the upper guide member is provided with an orifice in a wall thereof for communication with the source of compressed air, and the inner slide member has a section of a diameter to provide a valve for cooperation with said orifice, the remaining length of the inner slide member being of a diameter to provide a communicating passage between such remaining length and the surrounding outer slide member and surrounding ejector member; wherein the means for retaining the ejector member adjacent said guide member orifice comprises clutch means positioned at the upper guide member and cooperable with the outer slide member; and wherein the area of the lower guide member adjacent its dispensing orifice and the area of the ejector member adjacent the annular wall thereof receivable in the dispensing orifice are of a configuration providing means to impart an angled edge to the plastic charge forced through the dispensing orifice.

6. A metering device for dispensing measured amounts of moldable plastic material comprising a body section having a substantially horizontally extending material intake passage and a substantially horizontally extending discharge passage in communication with and lying in a different plane than the intake passage, a vertically reciprocable measuring plunger adapted to deliver a predetermined quantity of plastic material from the intake passage to the discharge passage, said plunger being movable between the exit end of the intake passage and the inlet end of the discharge passage, check valve means responsive to the movement of the measuring plunger to close communication between the intake passage and the discharge passage when the measuring plunger is retracted, a delivery plunger assembly adjacent the exit end of the discharge passage, said delivery plunger assembly comprising an upper hollow guide member secured to said body section, a hollow outer slide member mounted for vertical reciprocable movement in said guide member, a lower hollow guide member secured to said body section having the interior thereof in communication with the outlet end of said discharge passage, a hollow ejector member secured to the lower end of said outer slide member for movement therewith received in said second guide member, a vertically reciprocable inner slide member positioned to extend through said outer slide member and extending into said ejector member, said lower guide member being formed to provide a dispensing orifice and said ejector member having an annular wall defining an opening in the lower end thereof, said annular wall being receivable in said orifice with a close fit, said inner slide member being formed to provide communication between a source of compressed air and said opening, said inner slide member also being formed at the end thereof for cooperation with the opening in the ejector member to provide both a delivery plunger and a valve depending upon the position of the inner slide member with respect to the ejector member, means for imparting alternate reciprocation to the measuring plunger and to the inner slide member, means for causing the outer slide member and ejector member to move with the inner slide member, means for retaining the ejector member adjacent said guide member orifice before its retraction with the inner slide member, and conditioning means to prepare and deliver heated plastic material under pressure to said intake passage, said conditioning means comprising a tubular conduit, a rotatable extruder worm operative to advance the plastic material through said conduit, a jacketing chamber enclosing said conduit, and means to deliver a heated fluid to said jacketing chamber, whereby the plastic material advanced by said extruder worm to the intake passage is in a moldable condition.

7. A metering device as set forth in claim 6; wherein the upper guide member is provided with an orifice in a wall thereof for communication with the source of compressed air, and the inner slide member has a section of a diameter to provide a valve for cooperation with said orifice, the remaining length of the inner slide member being of a diameter to provide a communicating passage between such remaining length and the surrounding outer slide member and surrounding ejector member; wherein the means for retaining the ejector member adjacent said guide member orifice comprises clutch means positioned at the upper guide member and cooperable with the outer slide member; and wherein the area of the lower guide member adjacent its dispensing orifice and the area of the ejector member adjacent the annular wall thereof receivable in the dispensing orifice are of a configuration providing means to impart an angled edge to the plastic charge forced through the dispensing orifice.

8. A metering device for dispensing measured amounts of moldable plastic material comprising a body section having a material intake passage and a discharge passage in communication with the intake passage, a reciprocable measuring plunger movable across the exit end of said intake passage and to the inlet end of said discharge passage a reciprocable delivery plunger movable across the exit end of said discharge passage, the measuring plunger being adapted to deliver a predetermined quantity of plastic material from said intake passage directly to said discharge passage to thereby present a predetermined quantity of the material into the path of movement of the delivery plunger, means to effect alternate reciprocation of the measuring and delivery plungers, and resiliently mounted valve means in alignment with the measuring plunger to close communication between the intake passage and the discharge passage when the measuring plunger is retracted.

9. A metering device for dispensing measured amounts of moldable plastic material comprising a body section having a material intake passage and a discharge passage in communication with the intake passage, a reciprocable measuring plunger movable across said intake passage, a reciprocable delivery plunger movable across said discharge passage, the measuring plunger being adapted to deliver a predetermined quantity of plastic material from said intake passage to said discharge passage to thereby present a predetermined quantity of the material into the path of movement of the delivery plunger, means to effect alternate reciprocation of the measuring and delivery plungers, means to close communication between the intake passage and the discharge passage when the measuring plunger is retracted, and means associated with the delivery plunger for discharging compressed air for detaching plastic material from said plunger.

10. A metering device for dispensing measured amounts of moldable plastic material comprising a body section having a substantially horizontally extending material intake passage and a substantially horizontally extending discharge passage in communication with and lying in a different plane than the intake passage, a vertically reciprocable measuring plunger movable across the exit end of the intake passage and to the inlet end of the discharge passage, a vertically reciprocable delivery plunger movable across the exit end of the discharge passage, the measuring plunger being adapted to deliver a predetermined quantity of plastic material from said intake passage directly to said discharge passage to thereby present a predetermined quantity of plastic material in the path of movement of the delivery plunger, means to effect alternate reciprocation of the measuring and delivery plungers, and resiliently mounted valve means in alignment with the measuring plunger to close communication between the intake passage and the discharge passage when the measuring plunger is retracted.

11. A metering device for dispensing measured amounts of moldable plastic material comprising a body section having a substantially horizontally extending material intake passage and a substantially horizontally extending discharge passage in communication with and lying in a different plane than the intake passage, a vertically reciprocable measuring plunger movable between the exit end of the intake passage and the inlet end of the discharge passage, a vertically reciprocable delivery plunger movable across the exit end of the discharge passage, the measuring plunger being adapted to deliver a predetermined quantity of plastic material from said intake passage to said discharge passage to thereby present a predetermined quantity of plastic material in the path of movement of the delivery plunger, means to effect alternate reciprocation of the measuring and delivery plungers, valve means associated with the measuring plunger to close communication between the intake passage and the discharge passage when the measuring plunger is retracted, and means associated with the delivery plunger for discharging compressed air for detaching plastic material from said plunger.

12. A metering device for dispensing measured amounts of moldable plastic material comprising a body section having a substantially horizontally extending material intake passage and a substantially horizontally extending discharge passage in communication with and lying in a different plane than the intake passage, a vertically reciprocable measuring plunger movable between the exit end of the intake passage and the inlet end of the discharge passage, a vertically reciprocable delivery plunger movable across the exit end of the discharge passage, the measuring plunger being adapted to deliver a predetermined quantity of plastic material from said intake passage to said discharge passage to thereby present a predetermined quantity of plastic material in the path of movement of the delivery plunger, means to effect alternate reciprocation of the measuring and delivery plungers, valve means associated with the measuring plunger to close communication between the intake passage and the discharge passage when the measuring plunger is retracted, means to discharge compressed air through the free end portion of the delivery plunger, and conditioning means to prepare and deliver heated plastic material to said intake passage, said conditioning means comprising a tubular conduit, a rotatable extruder worm operative to advance the plastic material through said conduit, a jacketing chamber enclosing said conduit, and means to deliver a heated fluid to said jacketing chamber, whereby the plastic material advanced by said extruder worm to the intake passage is in a moldable condition.

13. A metering device for dispensing measured amounts of moldable plastic material comprising a body section having a material intake passage and a discharge passage in communication with the intake passage, a reciprocable measuring plunger adapted to deliver a predetermined quantity of plastic material from the intake passage to the discharge passage, said plunger being movable between the exit end of the intake passage and the inlet end of the discharge passage, means responsive to the movement of the measuring plunger to close communication between the intake passage and the discharge passage when the measuring plunger is retracted, a delivery plunger assembly adjacent the exit end of the discharge passage, said delivery plunger assembly comprising hollow guide means the interior of which is in communication with the exit end of said discharge passage, said guide means having an end orifice to allow passage of plastic material, a hollow outer slide member mounted for reciprocable movement in said guide means, said outer slide member having an annular wall defining an opening in the end thereof, said annular wall being adapted to be received in said guide means orifice, an inner slide member positioned to extend through said outer slide member, said inner slide member being formed to provide communication between a source of compressed air and said outer slide member opening, said inner slide member also being formed at the end thereof for co-operation with said outer slide member opening to provide both a delivery plunger and a valve depending upon the position of the inner slide member with respect to the outer slide member, means for imparting alternate reciprocation to the measuring plunger and to the inner slide member, means for causing the outer slide member to move with the inner slide member, and means for retaining the outer slide member adjacent said guide means end orifice before retraction of the outer slide member with the inner slide member.

References Cited by the Examiner

UNITED STATES PATENTS

| | | | |
|---|---|---|---|
| 1,902,295 | 3/33 | Shook | 18—12 |
| 1,987,748 | 1/35 | Norman et al. | 222—255 |
| 2,359,840 | 10/44 | Goessling | 18—30 |
| 2,653,348 | 9/53 | Elgin et al. | 18—12 |
| 2,950,501 | 8/60 | Harkenrider | 18—30 |
| 2,996,756 | 8/61 | Korsch et al. | 18—12 |

J. SPENCER OVERHOLSER, *Primary Examiner.*

MICHAEL V. BRINDISI, *Examiner.*